United States Patent Office.

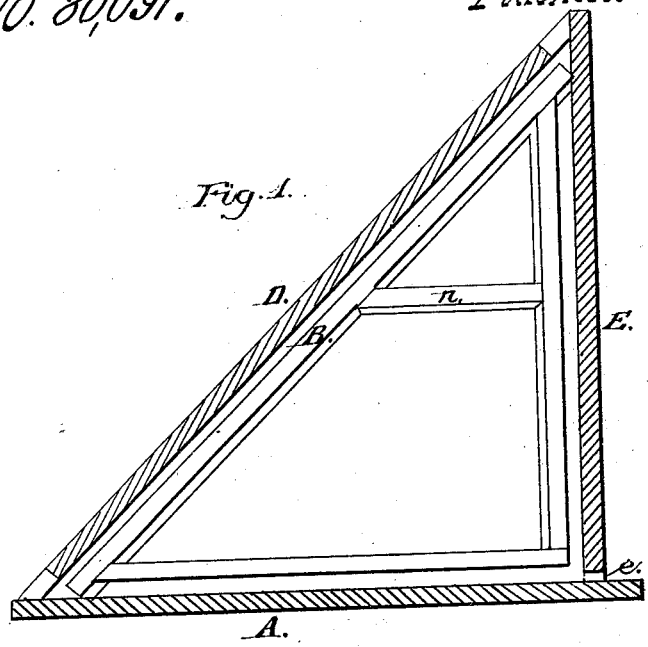
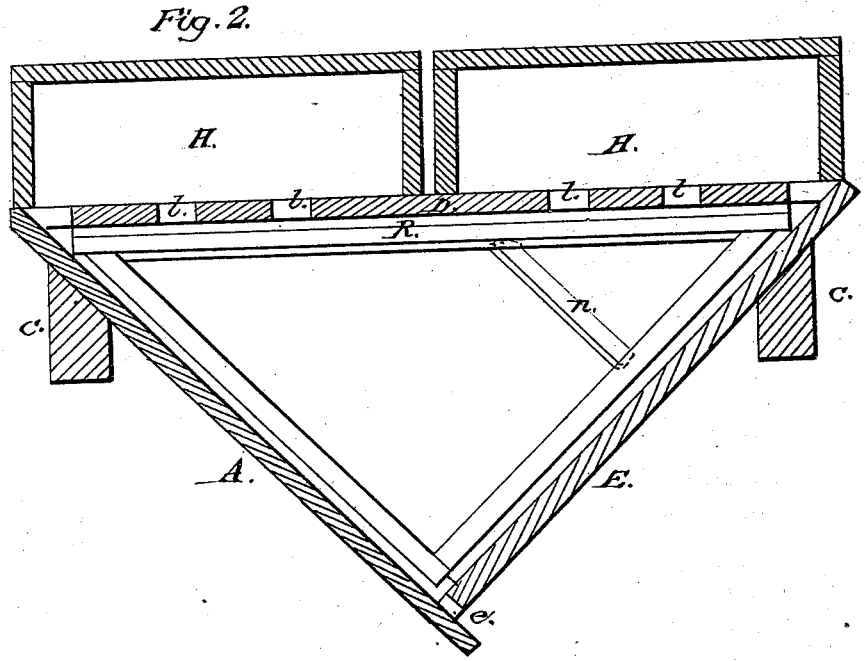

S. B. REPLOGLE, OF MARTINSBURG, PENNSYLVANIA.

*Letters Patent No. 80,091, dated July 21, 1868.*

IMPROVEMENT IN BEE-HIVE.

*The Schedule referred to in these Letters Patent and making part of the same.*

TO ALL WHOM IT MAY CONCERN:

Be it known that I, S. B. REPLOGLE, of Martinsburg, in the county of Blair, and State of Pennsylvania, have invented certain new and useful Improvements in Bee-Hives; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to the construction of bee-hives, and consists in constructing the hive and comb-frames in such a form that the hive can be used with its sides up, at different seasons of the year, whereby it is rendered better adapted to the purposes for which hives are used, than those constructed on the ordinary plan.

Figure 1 is a vertical section, representing the hive in position, as used in winter.

Figure 2 is a vertical section of the hive in a different position, for use in summer, with the honey-boxes in place.

In constructing bee-hives, it is customary to make them rectangular in form, and so constructed that they must always be used in the same position, that is to say, with the same side or end always uppermost.

One great objection to hives made in this way, is, that if made sufficiently large to accommodate the bees in summer, the bees are apt to die from cold in the winter, for the reason that, when they have consumed the honey in the lower portion of the combs, they are obliged to spread themselves over too great a space in their efforts to reach the remaining honey, and by being thus separated, the animal heat generated by them is more dissipated, and consequently the bees die for lack of the necessary warmth to support life and keep them active.

To obviate these difficulties, and produce a hive better adapted to the requirements of successful bee-culture, I construct my improved hive triangular in form, as represented in fig. 1, A and E being two of the sides united firmly at a right angle, and D being the removable side or top, usually denominated the honey-board. The base or side, A, is made to project a short distance beyond the point where it is united to the side E to form a lighting-board for the bees, and at the point of union, one or more holes, $e$, are made at the base of E, for the passage of the bees, as shown in figs. 1 and 2.

Within the hive thus formed I locate a series of movable comb-frames, B, consisting of three bars, united, so as to form a right-angle triangle corresponding in form with the interior of the hive, as shown in the drawings. These frames are so constructed that when inserted within the hive, they rest upon the sides A and E, at the extreme ends of the longer bar only, and so as to leave a space all around between them and the walls of the hive, sufficiently large to permit the bees to pass without difficulty.

In making the frames, I form the bars as represented in section in fig. 3, the inside edge forming a salient angle, $f$, to serve as a guide to direct the bees in building their comb, and thus insure their being built straight. I sometimes make the frames with a cross-bar, $n$, as represented in blue lines, which serves to act still further as a guide, and also assists to hold the comb more securely in place.

In using my hive, I proceed as follows: When the bees are first put into it, I place as represented in fig. 1, and as the bees always commence to build their comb from the upper point of the frame, they will, in this case, commence in the upper angle or corner, where the space between the bars is narrow, and as they build, the comb will be attached to the bars on each side, and will thereby be much more certainly built straight than when built from a long horizontal bar only, as in the ordinary hive.

After the comb has been built, and the season for storing surplus honey has arrived, or even previous to this time, the hive may be turned with its longer side, D, uppermost, and suspended in bars C, as shown in fig. 2, when the honey-boxes H are placed thereon, to receive the surplus honey in the usual manner.

After the honey-season is over, and the bees have eaten the honey out of the centre of the frames, the hive may then be turned up, as shown in fig. 1, whereby the bees will be concentrated in the upper and narrower portion or angle of the hive, where their warmth will be better utilized; and, if necessary, it may be turned, with the side E down, and thus bring the other corner uppermost.

Having thus described my invention, what I claim, is—

1. A bee-hive, consisting of a triangular box, having one side removable at pleasure, and otherwise constructed substantially as described.

2. In combination with the above-described hive, I claim the triangular comb-frame B, made of bars having their inner edges bevelled from each side to the centre, as shown in fig. 3.

S. B. REPLOGLE.

Witnesses:
   N. CAMPBELL,
   F. KLEPSER.